United States Patent
Burca et al.

(10) Patent No.: US 9,841,102 B2
(45) Date of Patent: Dec. 12, 2017

(54) KEY FOB SEAL STRUCTURE WITH PRESSURE RELEASE CAPABILITY

(71) Applicant: Continental Automotive Systems, Inc., Auburn Hills, MI (US)

(72) Inventors: John M Burca, Rochester Hills, MI (US); Scott Hall, Rochester Hills, MI (US); Karthik Narayan, Bloomfield Hills, MI (US); Wojciech Makiej, Rochester Hills, MI (US); Alan Honda, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/546,162

(22) Filed: Nov. 18, 2014

(65) Prior Publication Data

US 2016/0138716 A1     May 19, 2016

(51) Int. Cl.
| | |
|---|---|
| *F16J 15/06* | (2006.01) |
| *F16J 15/10* | (2006.01) |
| *B60R 25/10* | (2013.01) |
| *G07C 9/00* | (2006.01) |

(52) U.S. Cl.
CPC .......... *F16J 15/064* (2013.01); *B60R 25/10* (2013.01); *F16J 15/104* (2013.01); *G07C 9/00944* (2013.01)

(58) Field of Classification Search
CPC F16J 15/064; F16J 15/06; F16J 15/104; F16J 15/10; H01L 23/10
See application file for complete search history.

(56) References Cited

U.S. PATENT DOCUMENTS

| | | | |
|---|---|---|---|
| 4,636,593 A * | 1/1987 | Novak | H01H 13/702 200/313 |
| 4,758,004 A * | 7/1988 | Semon | A61G 17/02 27/17 |
| 5,526,526 A | 6/1996 | Clark et al. | |
| 6,621,446 B1 * | 9/2003 | Chaillie | E05B 19/04 200/302.1 |
| 6,696,639 B1 * | 2/2004 | Nurmi | B21C 37/045 174/363 |
| 7,514,642 B2 | 4/2009 | Burca et al. | |

(Continued)

OTHER PUBLICATIONS

International Search Report and Written Opinion dated Feb. 25, 2016 from corresponding International Patent Application No. PCT/US2015/060633.

*Primary Examiner* — Eugene G Byrd

(57) ABSTRACT

A self-venting device includes a first component having an interior, a second component coupled to the first component so as to close the interior, and seal structure engaged between the first and second components in a sealed state so as to seal the interior from external agents. The seal structure includes a plurality of seal members, each having a resilient seal tip extending therefrom. The seal tips are constructed and arranged such that 1) when pressure inside the interior is equal to pressure outside of the device, the seal tips are compressed between the first and second components in the sealed state, and 2) when pressure in the interior is greater than the pressure outside of the device causing the second component to move away from the first component, the seal tips move to an unsealed state, permitting air to exit from the interior.

17 Claims, 1 Drawing Sheet

(56) References Cited

U.S. PATENT DOCUMENTS

| | | |
|---|---|---|
| 7,598,462 B2 | 10/2009 | Burca et al. |
| 9,022,162 B2* | 5/2015 | Konno .................... B62M 7/02 180/287 |
| 2004/0201512 A1* | 10/2004 | Sugimoto ........... E05B 19/0082 341/176 |
| 2006/0054484 A1 | 3/2006 | Uleski et al. |
| 2006/0186990 A1 | 8/2006 | Yamamoto et al. |
| 2007/0131530 A1 | 6/2007 | Burca et al. |
| 2011/0272463 A1 | 11/2011 | Jennings et al. |
| 2013/0042765 A1* | 2/2013 | Chameroy .......... A47J 27/0804 99/337 |

\* cited by examiner

KEY FOB SEAL STRUCTURE WITH PRESSURE RELEASE CAPABILITY

FIELD

The invention relates to automotive key fobs for remote keyless entry and, in particular, to a fob that releases internal pressure build-up due to environmental heating.

BACKGROUND

Conventional key fobs for remote keyless entry include an elastomeric seal to prevent liquids (e.g., water) from entering the fob. Due to the seal, pressure can build-up inside the fob due to environmental heating, such as by sun exposure, which may cause inadvertent opening of the fob.

Thus, there is a need to provide a fob that allows air to escape upon pressure build-up.

SUMMARY

An object of the invention is to fulfill the needs referred to above. In accordance with the principles of the present invention, this objective is obtained by providing a self-venting device that includes a first component having an interior, a second component coupled to the first component so as to close the interior, and seal structure engaged between the first and second components in a sealed state so as to seal the interior from external agents. The seal structure includes a plurality of seal members, each having a resilient seal tip extending therefrom. The seal tips are constructed and arranged such that 1) when pressure inside the interior is equal to pressure outside of the device, the seal tips are compressed between the first and second components in the sealed state, and 2) when pressure in the interior is greater than the pressure outside of the device causing the second component to move away from the first component, the seal tips move to an unsealed state, permitting air to exit from the interior.

In accordance with another aspect of a disclosed embodiment, a method vents a device having a first component and second component. The method provides seal structure engaged between the first and second components in a sealed state so as to seal the interior from external agents, such that when pressure inside the interior is equal to pressure outside of the device, a resilient portion of the seal structure is compressed between the first and second components in the sealed state. When pressure in the interior is greater than the pressure outside of the device causing the second component to move away from the first component, the method ensures that the resilient portion of the seal structure moves to an unsealed state, permitting air to exit from the interior.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
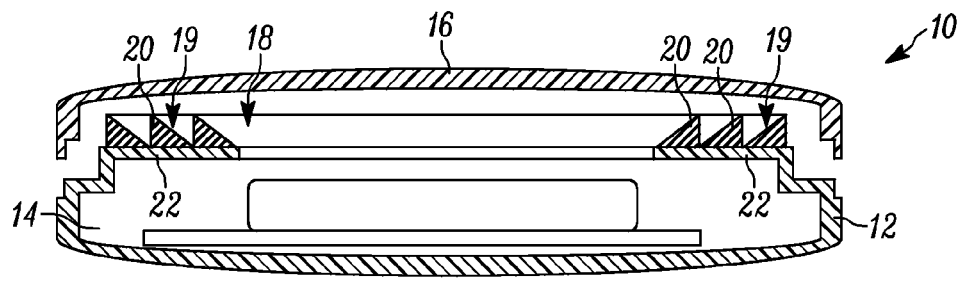
FIG. 1 is a cross-sectional view of a key fob for a vehicle, shown with a cover removed from a body and with seal structure, in a relaxed state, provided in accordance with an embodiment.

With reference to FIG. 1, a self-venting device in the form of a key fob is shown generally indicated at 10, for remote keyless entry of a vehicle. The fob 10 includes a first component in the form of a body 12 having an interior 14. A second component in the form of a cover 16 is attached to the body 12 so as to close the interior 14. The cover 16 is removable from the body 12 to gain access to the interior 14 of the fob, for example, to change a battery therein. In FIG. 1, the cover 16 is shown removed from the body 12.

In accordance with an embodiment, seal structure, generally indicated at 18, is provided between and engaged with a portion of the cover 16 and a portion of the body 12 in a sealed state to provide an axial airtight seal for the interior 14 against external environmental agents. The seal structure 18 is preferably an elastomer O-ring, having a plurality of seal members, generally indicated at 19, with each seal member including a resilient seal tip 20 that extends from a base 22 in a cantilever manner. FIG. 1 shows the seal tips 20 in a relaxed state. In the embodiment, in cross-section, each seal member 19 is of generally triangular shape, with the seal tip 20 defining an apex. A plurality of adjacent seal members 19 define a generally saw-tooth structure.

Figure 2:
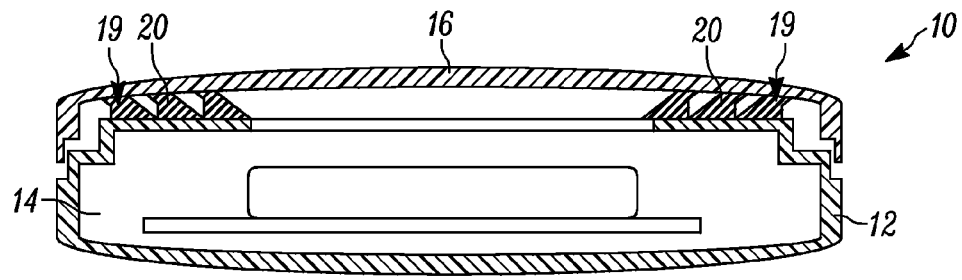
FIG. 2 is a view of the key fob of FIG. 1, but shown with the cover coupled to the body and compressing seal tips of the seal structure.
Figure 3:
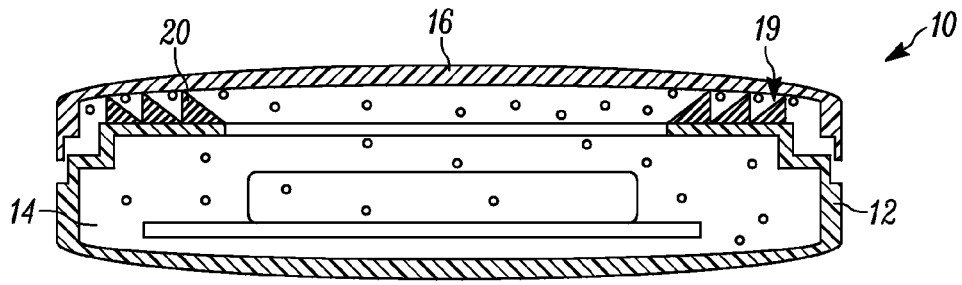
FIG. 3 is a view of the key fop of FIG. 2, but shown with pressure increase in an interior of the fob causing the seal tips of the seal structure move to an unsealed state, thereby permitting air to exit the interior.

With reference to FIG. 2, the seal tips 20 are constructed and arranged such that when pressure inside the interior 14 is equal to pressure outside of the fob 10, the seal tips 20 are compressed (e.g., bent) between the body 12 and the cover 16 to maintain the sealed state between the body 12 and the cover 16. With reference to FIG. 3, when pressure in the interior 14 is greater than the pressure outside of the fob 10 (e.g., from exposure to the heat of the sun) causing the cover 16 to move away from the body 12, the seal tips 20 automatically move minutely to an unsealed state (a state of less or no compression), permitting air to exit from the interior 14 by escaping around the perimeter of the seal structure 18. Once the pressure build-up in the interior 14 is relieved, the cover 16 automatically moves back to its normal position, compressing the seal tips 20, returning the seal structure 18 to its sealed state.

Figure 4:
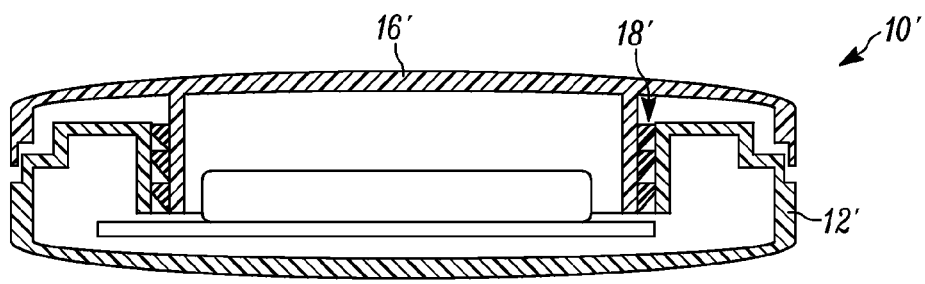
FIG. 4 is a view of a key fob having seal structure provided in accordance with another embodiment.

FIG. 4 shows another embodiment of a key fob 10' with the seal structure 18' providing a radial seal between the cover 16' and the body 12'.

Thus, the seal structure 18 provides self-venting (pressure relief) of the key fob 10 in addition to providing highly reliable sealing at no additional cost.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A self-venting device comprising: a first component having an interior, a second component being coupled to the first component so as to close the interior, and seal structure engaged between the first and second components in a sealed state so as to seal the interior from external agents, the seal structure comprising a plurality of seal members, each having a resilient seal tip extending therefrom, the seal tips being constructed and arranged such that 1) when pressure inside the interior is equal to pressure outside of the device, the seal tips are compressed between the first and second components in the sealed state, and 2) when pressure in the interior is greater than the pressure outside of the device causing the second component to move away from the first component, the seal tips move to an unsealed state, permitting air to exit from the interior, wherein each of the seal members is of generally triangular shape, the triangular shape comprising a first side and a second side, the first and the second sides adjacent to the seal tip, the first side being longer and more proximate to the interior than the second side.

2. The device of claim 1, wherein the device is a key fob for remote keyless entry of a vehicle and the first component is a body and the second component is a cover.

3. The device of claim 1, wherein the seal structure is an elastomer O-ring.

4. The device of claim 3, wherein each seal tip extends from a seal member in a cantilever manner.

5. The device of claim 3, wherein each seal tip defines an apex.

6. The device of claim 5, wherein a plurality of adjacent seal members form a generally saw-tooth structure.

7. The device of claim 1, wherein the seal structure is constructed and arranged to provide an axial seal between the first component and the second component.

8. The device of claim 1, wherein the seal structure is constructed and arranged to provide a radial seal between the first component and the second component.

9. A self-venting device comprising:
a first component having an interior,
a second component being coupled to the first component so as to close the interior, and
a means for sealing the interior from external agents, the means for sealing being engaged between the first and second components in a sealed state, the means for sealing being constructed and arranged such that when pressure inside the interior is equal to pressure outside of the device, the means for sealing is engaged between the first and second components in the sealed state, and when pressure in the interior is greater than the pressure outside of the device causing the second component to move away from the first component, the means for sealing permits air to exit from the interior,
wherein the means for sealing comprises a plurality of seal members, each of the seal members being of generally triangular shape, the triangular shape comprising a first side and a second side, the first and second sides adjacent to a seal tip, the first side being longer and more proximate to the interior than the second side.

10. The device of claim 9, wherein the means for sealing is an elastomer O-ring comprising resilient portions, the resilient portions comprise the plurality of seal members, each of the seal members having a resilient seal tip extending therefrom in a cantilever manner.

11. The device of claim 10, wherein each seal tip defines an apex.

12. The device of claim 11 wherein each seal member has a single seal tip and the single seal tip defines a single apex.

13. The device of claim 5 wherein each seal member has a single seal tip and the seal tip defines a single apex.

14. The device of claim 6 wherein each seal member has a single seal tip and the seal tip defines a single apex.

15. The device of claim 9, wherein the means for sealing comprises resilient portions configured to move to an unsealed state when pressure in the interior is greater than the pressure outside of the device, permitting air to exit from the interior.

16. The device of claim 1, wherein the triangular shape is substantially a right triangle.

17. The device of claim 9, wherein the triangular shape is substantially a right triangle.

* * * * *